May 29, 1951
P. H. BILLS ET AL
2,554,612
ALCOHOL-WATER INJECTION MEANS FOR
INTERNAL-COMBUSTION ENGINES
Filed April 5, 1950
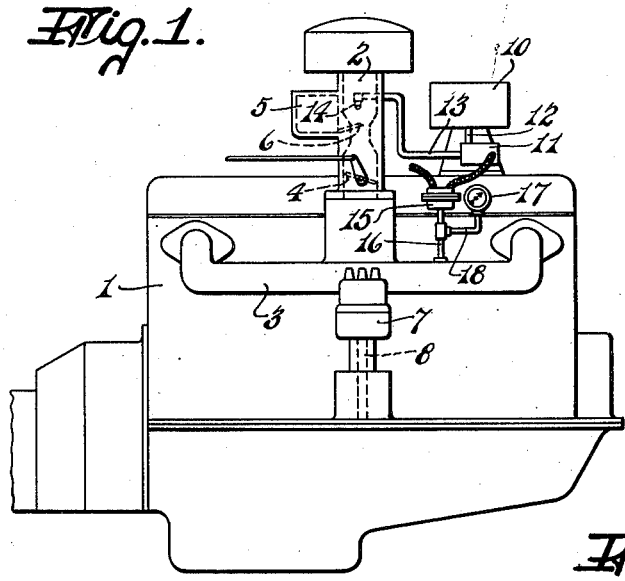
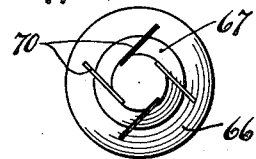
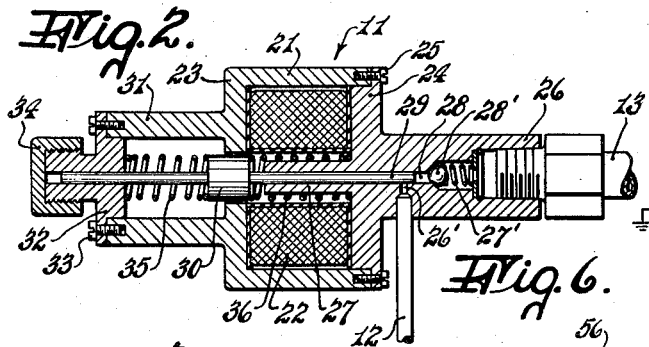
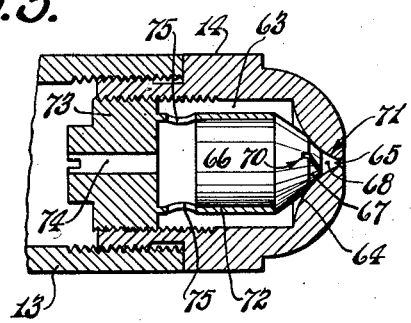
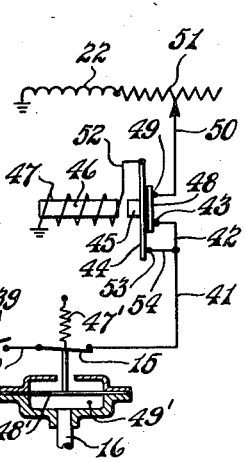
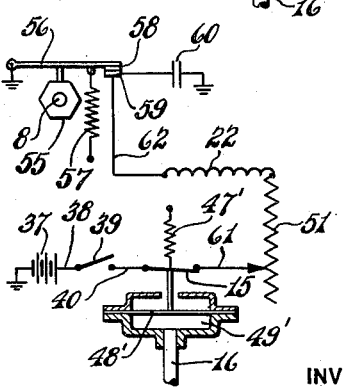
INVENTORS
PHILIP H. BILLS, JOSEPH A. LOGAN
AND THEODORE J. MESH
BY Chapin & Neal
ATTORNEYS Patented May 29, 1951

2,554,612

UNITED STATES PATENT OFFICE 2,554,612

ALCOHOL-WATER INJECTION MEANS FOR INTERNAL-COMBUSTION ENGINES

Philip H. Bills, Longmeadow, Joseph A. Logan, Hadley, and Theodore J. Mesh, Easthampton, Mass., assignors to Gilbert & Barker Manufacturing Company, West Springfield, Mass., a corporation of Massachusetts Application April 5, 1950, Serial No. 154,174

6 Claims. (Cl. 123—25)

This invention relates to an improved apparatus for injecting liquids, having anti-knock and cooling qualities, into the air intake of an internal combustion engine, in a controlled manner and in accordance with the need.

It is well known that a mixture of water with one or more of the alcohols can be injected into the intake of an internal combustion engine, using a low octane gasoline, to give the performance of regular or premium grade gasoline and it can be injected with regular gasoline to give the performance of super-octane gasoline. The excellent anti-knock qualities of the alcohols, together with the high heats of vaporization of alcohols and water, lower the intake temperature and raised the effective octane number of the gasoline. In general, when the average automobile is driven on level roads at speeds up to 40 miles per hour, the engine will operate satisfactorily on gasoline of 50 octane number or lower. However, at higher speeds, during acceleration, hill climbing and, in general, when the engine is working hard, the high octane fuel is required. The alcohol-water injection is used, during such times as the engine is working hard, to supply the higher octane fuel. Thus, there can be had the economy of using a low octane fuel and raising its octane rating by automatically injecting the alcohol-water mixture only when needed.

This invention has for one object the provision of an electromagnetically-operable reciprocating-piston pump for forcing the alcohol-water mixture through a spray nozzle, located in the intake pipe leading to the inlet manifold of an internal combustion engine of an automotive vehicle, such pump operating from the low voltage direct current, which is available from the storage battery of the vehicle and which is converted by a suitable vibrator into pulsating current of high frequency, of the order of several thousand cycles per minute or more, to effect in cooperation with the spray nozzle an exceedingly fine atomization of the alcohol-water mixture so that it will be quickly and effectively mixed with the air and fuel.

According to another object of the invention, the pump is controlled by a switch, which is actuated in response to suction in the engine manifold, opening and closing it accordingly as the vacuum in such manifold is greater or less than a predetermined value, whereby the alcohol-water injection is made to occur during the periods when the engine is working hard.

Another object of the invention is to produce a spray of the alcohol-water mixture by the use of a mechanical-atomizing nozzle, supplied intermittently but at high frequency by a pump of the type described.

A further object of the invention, is to utilize the circuit breaker of the ignition system of the engine as the vibrator to produce from the low voltage direct current available from the storage battery of the automotive vehicle, the necessary high frequency pulsating current needed for operation of the electro-magnetically-actuated pump. This arrangement has the advantage that the speed of the pump increases with the speed of the engine so that the mixture is supplied at a rate which increases proportionately to the engine speed.

These and other objects will best be understood from the following description of illustrative examples of the invention with reference to the accompanying drawings in which:

Fig. 1 is a small-scale elevational view illustrating the application of the injection apparatus to an internal combustion engine;

Fig. 2 is a sectional elevational view of the electro-magnetically operated pump;

Fig. 3 is an enlarged sectional elevational view of the mechanical atomizing spray nozzle;

Fig. 4 is an enlarged end view of the inner end wall member of the whirl chamber of the nozzle;

Fig. 5 is a diagrammatical view of the electrical connections of the apparatus; and Fig. 6 is a similar diagrammatical view showing the ignition breaker substituted for the vibrator of Fig. 5.

Referring to these drawings, there is shown in Fig. 1 an internal combustion engine 1 of the spark-ignition type for use in driving automotive vehicles. The air intake pipe is represented at 2, the intake manifold at 3, the throttle valve at 4, the carburetor at 5; the fuel nozzle, for supplying gasoline from the carburetor into the air intake 2, at 6. The breaker and distributor housing is indicated at 7 and the timer shaft therein, at 8. This shaft is driven from the engine cam shaft in the usual manner and thus its speed is proportional to the speed of the engine crankshaft and the propeller shaft of the automotive vehicle.

In Fig. 1, the injection apparatus is indicated in a general way. There is a reservoir 10 of any suitable size and kind for containing a supply of the alcohol-water mixture or other liquid to be injected into the air intake 2 of the engine. The electromagnetically-actuated pump is indicated at 11 with its inlet pipe 12 connected to the bottom of the reservoir and its outlet pipe 13 extending to and entering the air intake pipe 2 and having on its end a suitable spray nozzle 14, located above the fuel nozzle 6 and throttle 4, to deliver a spray of finely atomized mixture downwardly or in the direction of flow of the fuel mixture in the intake 2. A switch 15, controlled by suction from the intake manifold 3 by means of a conduit 16 connected to the manifold, is provided for controlling the pump. This switch is shown diagrammatically in Figs. 5 and 6. It is arranged to be held open when the vacuum in the manifold 3 is relatively high and to close, when the vacuum in such manifold is relatively low. For example, the switch may be arranged to close, when the vacuum decreases to seven inches of mercury, and stay closed on further decrease of the vacuum to zero. The switch will open when the vacuum in manifold 3 is greater than seven inches of mercury and remain open for all higher degrees of vacuum. There may, if desired, be a gauge, such as 17, connected by a pipe 18 to pipe 16 and thus to manifold 3 and showing the degrees of vacuum existing in the manifold for the purpose of regulating the suction controlled switch 15 so as to open at the desired times.

The electromagnetically-operated pump 11 is shown in detail in Fig. 2. This pump includes a casing of magnetic material having a hollow cylindrical portion 21, which houses a solenoid 22 and has an annular rear wall 23. A head 24, suitably secured, as by screws 25, to the portion 21 closes the front end of the latter. This head 24 has an outer and forwardly-extending cylindrical portion 26 and an inner, smaller and coaxial cylindrical portion 27 extending into the portion 21 and through the central opening of the solenoid 22. A pump cylinder 28 is formed in the parts 26 and 27, slidably receiving a piston, comprising the forward end of a rod 29 of small diameter. This cylinder has an inlet port 26' to which pipe 12 is connected and an outlet chamber 27' to which pipe 13 is connected. A valve 28' controls communication between cylinder 28 and chamber 27'. The piston rod has fixed thereto an annular armature 30, which is of magnetic material and closely but slidably fits the opening in the annular end wall 23. Extending rearwardly from the latter is a hollow cylindrical portion 31, which at its rear end is closed by a head 32, suitably secured thereto, as by screws 33, and providing a guide for the rear end of rod 29. The parts 31 and 32 need not necessarily be made of magnetic material. The opening, in which rod 29 slides, may be closed at its rear end by a cap 34, threaded on head 32, as shown. A spring 35 acts between the rear head 32 and member 30 and a similar spring 36 acts between this member and the forward head 24. The parts are shown in their rest positions with the piston in the middle of its stroke. Energization of solenoid 22 will magnetize the casing parts 21, 24, 27 and 23 and cause member 30 to be drawn forwardly toward the adjacent end of member 27 and move the piston on its pressure stroke. When the solenoid is deenergized, the spring 36 will move the piston to the left to the end of its suction stroke.

The solenoid 22 is connected, as shown in Fig. 5, to be operated from the usual storage battery 37 of the automotive vehicle. One terminal of this battery is grounded as usual. The other terminal of the battery is connected by a wire 38 to one terminal of the ignition switch 39 and the other terminal of the latter is connected by a wire 40 to one terminal of switch 15. The other terminal of the switch 15 is connected by wires 41 and 42 to a stationary contact 43 of a vibratory switch, which includes a vibrating arm 44 having an armature 45 to be attracted by the core 46 on which is mounted a coil 47. This arm 44 carries, insulated therefrom, a conductor 48 for connecting the contact 43 to a similar stationary contact 49, which is connected by a wire 50 to one terminal of a variable resistor 51. The other terminal of this resistor is connected to one terminal of solenoid 22 and the other terminal of the latter is grounded. The magnet coil 47 has one terminal grounded and the other terminal is connected by a wire 52 to the vibrating arm 44, which cooperates with a stationary contact 53, connected by a wire 54 to wire 41. Thus, when switches 39 and 15 are closed, the magnet coil 47 will be energized from battery 37 through the circuit which extends from the ungrounded terminal of the battery by wire 38, closed switch 39, wire 40, closed switch 15, wires 41 and 54, contact 53, arm 44, wire 52 and coil 47 to the ground and thus to the other terminal of the battery. The spring arm 44 will be attracted by magnetized core 46, which will break the supply to coil 47 and release arm 44 to spring back into engagement with contact 53 and reestablish the circuit to coil 47. This action will be repeated in the well known manner and arm 44 will vibrate and rapidly open and close the supply circuit to coil 47 and also to the supply circuit to solenoid 22 because the conductor 48 on arm 44 will connect and disconnect the contacts 43 and 49 in synchronism. The design of the vibrator switch is such that a pulsating current of say 3600 cycles a minute is produced.

The switch 15 is shown diagrammatically in Fig. 5. It is moved to closed position by a spring 47' and to open position by atmospheric pressure on a diaphragm 48' which forms a movable wall for the chamber 49', the latter being connected by pipe 16 to the inlet manifold 3 of the engine.

An alternative supply circuit for solenoid 22 is shown in Fig. 6. Here, the vibrator switch is replaced by the breaker used to control the ignition system of the engine. The timer shaft 8 carries the usual cam 55 for moving the breaker arm 56 against a return spring 57. The arm 56 carries a breaker point 58 for cooperation with a stationary and insulated breaker point 59. The usual condenser 60 is bridged across these breaker points. One terminal of the breaker arm 56 is grounded and thus electrically connected to the grounded terminal of battery 37. The other terminal of the battery is connected as before by wire 38, switch 39, wire 40 and switch 15 and then by a wire 61 to one terminal of the variable resistor 51, the other terminal of which is connected to one terminal of solenoid 22. The other terminal of the solenoid is connected by a wire 62 to insulated breaker point 59. Thus, whenever switches 39 and 15 are closed, the circuit to solenoid 22 will be opened and closed a plurality of times (six as shown) during each revolution of the timer shaft 8, which rotates at half the speed of the engine crankshaft and the propeller shaft of the automotive vehicle. Thus, the speed of the pump will increase proportionately with the speed of the engine and the alcohol-water mixture will be supplied at a rate, which increases proportionately to the engine speed. Assuming that the maximum speed of the engine is 3000 R. P. M., and that it has six cylinders, the circuit to the solenoid 22 would be opened and closed 9000 times per minute at full engine speed.

The variable resistor 51 provides for variation of the current to the solenoid 22. Thus, the power effective to drive the pump piston 29 may be varied and this will vary the stroke of the pump and the volume of liquid dischaged on each pressure stroke of the piston.

The spray nozzle is preferably of the mechanical atomizing type, one example of which is shown in Fig. 3. The nozzle body 14 has therein a cylindrical and axially-directed opening 63, partially screw threaded as shown and extending from one end face of the body forwardly toward, but terminating short of, the other end face of the body with a recess having a converging peripheral wall 64, terminating with an outlet orifice 65, which is of fixed and very small diameter and opens through the last-named end face of the nozzle body. The opening 63, recess 64 and orifice 65 are coaxial. A member 66 has at its forward end a frusto-conical part 67 which tightly seats against a portion of the converging peripheral wall 64, leaving forwardly of such part a space 68, which forms the whirl chamber of the nozzle. This chamber is closed at its rear end by the small end face of the part 67, except for a plurality of inlet passages 70, which are formed by grooves in the frusto-conical surface of the part 67 (see Fig. 4) and which lead tangentially into the whirl chamber 68 adjacent its large end. The whirl chamber has a peripheral wall 71, which converges from its rear wall forwardly to its outlet orifice 65. The member 66 is fixed in the forward tubular extension 72 of a nut 73 threaded into opening 63. Nut 73 has an axial passage 74 therethrough leading into the interior of member 72 which has openings 75 in its periphery leading into the opening 63 at a location forwardly of nut 73. Thus liquid drawn from reservoir 10 through pipe 12 into cylinder 28 by piston 29 may be forced outwardly past valve 28' into chamber 27' and thence through pipe 13 into passage 74. From the latter the liquid passes into the interior of member 72 and thence through holes 75 into the opening 63 and thence to the tangential inlets 70 of whirl chamber 68 and out through orifice 65.

The size of the nozzle 14 will be chosen to suit the need. For use with the engine of the average passenger automobile, the nozzle will be one of the very small sizes, as for example, one rated to discharge .6 gallon per hour under a uniform pressure of say 100 pounds per square inch. Nozzles with much smaller orifices can be used with the alcohol-water mixture without clogging than could be used with liquids of greater viscosity, such as oil. The actual rate of flow from this nozzle can be reduced by decreasing the power applied to solenoid 22. A nozzle of this type, when supplied with liquid by a pump of the type described at frequencies of the order disclosed, will yield excellent atomization at flow rates which are substantially less than those for which the nozzle is rated to operate at uniform pressure. While the delivery of liquid to the nozzle occurs in pulses, these pulses occur at high frequency and are of high instantaneous pressure and it is possible to impart more energy to a given quantity of liquid in a given time than can be done with the ordinary rotary fuel pump which produces a uniform pressure of lower value. Better atomization results. The pressure values are relatively higher than the pressure for which the nozzle is rated and even when its rate of flow is decreased below the rated value, the pressure remains high enough to secure good atomization.

When the engine is in operation, the ignition switch 39 will be closed. The switch 15 will then control the electromagnetically-operated reciprocating piston pump, which when operated will deliver the alcohol-water mixture to the spray nozzle 14 in pulses of relatively high pressure and at relatively high frequency. Excellent atomization results and the mixture is emitted from the nozzle in a mist-like spray of exceedingly finely divided particles. This spray is readily mixed with the fuel and air drawn through the intake into the inlet manifold of the engine. The pump is brought into play only when the engine is working hard as manifested by the degree of suction existing in the intake manifold 3. When the suction in such manifold decreases to a certain predetermined value, say for example to seven inches of mercury, switch 15 will close and cause energization of solenoid 22 to actuate the pump which will continue to operate at all lower degrees of vacuum. It will not operate when the suction in the intake manifold is great than the predetermined value. This will insure injection of the alcohol-water mixture at the proper times, as during acceleration, hill climbing and high speeds. When the engine is stopped, ignition switch 39 will be open so that the pump will not operate even though switch 15 is closed by zero vacuum. The pump may be operated at uniform frequency from the storage battery of the automobile using a vibrator as shown in Fig. 5 or at frequencies which vary proportionately with the engine speed as shown in Fig. 6. The Fig. 6 arrangement is of value as enabling the rate of alcohol-water injection to increase with the speed of the engine and the automotive vehicle. The rate of injection of the alcohol-water mixture can also be controlled by adjustment of the variable resistor which has the effect of varying the stroke of the pump. The variable resistor adjustment will generally be used to initially secure the desired proportion of the alcohol-water mixture and fuel. The control of the pump by the breaker of the ignition system of the engine provides for automatic regulation of the rate of injection of the alcohol-water mixture so that such rate increases with the engine speed.

The invention thus provides an improved apparatus for injecting liquids having anti-knock and cooling qualities, into the air intake of an internal combustion engine, whereby such liquids may be injected according to the need and in a finely atomized state.

What is claimed is:

1. The combination in an internal combustion engine with the inlet manifold, the air intake pipe leading to such manifold and the fuel nozzle in such pipe, of a spray nozzle in said pipe adjacent the fuel nozzle, a supply reservoir for anti-knock liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, a vibrator in said circuit for interrupting it at high frequency, a control switch, and pneumatic means connected to the intake manifold for actuating the control switch, opening and closing it accordingly as the vacuum in the manifold is greater or less than a predetermined value.

2. The combination in an internal combustion engine with the inlet manifold, the air intake pipe leading to such manifold, and the fuel nozzle in such pipe, of a spray nozzle in said pipe adjacent the fuel nozzle for emitting an atomized spray of anti-knock liquid into said pipe in a direction toward the inlet manifold, a supply reservoir for said liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, a variable resistor in said circuit for varying the power applied to said means, a vibrator in said circuit for interrupting the same at high frequency, a control switch, and pneumatic means connected to the intake manifold for actuating the control switch, opening and closing it accordingly as the vacuum in the manifold is greater or less than a predetermined value.

3. The combination in an internal combustion engine with the inlet manifold, the air intake pipe leading to such manifold, and the fuel nozzle in such pipe, a mechanical-atomizing nozzle in said pipe adjacent the fuel nozzle for emitting an atomized spray of anti-knock liquid into said pipe in a direction toward the inlet manifold, a supply reservoir for said liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, a vibrator in said circuit for interrupting the same at high frequency, a control switch, and pneumatic means connected to the intake manifold for actuating the control switch, opening and closing it accordingly as the vacuum in the manifold is greater or less than a predetermined value.

4. The combination in an internal combustion engine with the crankshaft, the inlet manifold, the air intake pipe leading to such manifold, and the fuel nozzle in such pipe, of a spray nozzle in said pipe adjacent the fuel nozzle, a supply reservoir for an anti-knock liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, an interrupter switch in said circuit, means driven from the crankshaft for opening and closing said switch a plurality of times during each revolution of the crankshaft, a control switch, and pneumatic means connected to the intake manifold for actuating the control switch, opening and closing it accordingly as the vacuum in the manifold is greater or less than a predetermined value.

5. The combination in an internal combustion engine with the crankshaft, the inlet manifold, the air intake pipe leading to such manifold, and the fuel nozzle in such pipe, of a spray nozzle in said pipe adjacent the fuel nozzle for emitting an atomized spray of anti-knock liquid into said pipe in a direction toward the inlet manifold, a supply reservoir for said liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, an interrupter switch in said circuit, means driven from the crankshaft for opening and closing said switch a plurality of times during each revolution of the crankshaft, a control switch, and pneumatic means connected to the intake manifold for actuating the control switch, opening and closing it accordingly as the vacuum in the manifold is greater or less than a predetermined value.

6. The combination in an internal combustion engine with the crankshaft, the inlet manifold, the air intake pipe leading to such manifold, and the fuel nozzle in such pipe, of a mechanical-atomizing nozzle in said pipe adjacent the fuel nozzle for emitting an atomized spray of anti-knock liquid into said pipe in a direction toward the inlet manifold, a supply reservoir for said liquid, a reciprocating piston pump having its inlet connected to said reservoir and its outlet connected to said spray nozzle, electromagnetically-operated means for reciprocating the piston of said pump, an energizing circuit for said means adapted for connection to a supply of low-voltage direct current, an interrupter switch in said circuit, means driven from the crankshaft for opening and closing said switch a plurality of times during each revolution of the crankshaft, a control switch, and pneumatic means connected to the intake manifold for actuating the control switch, opening and closing it accordingly as the vacuum in the manifold is greater or less than a predetermined value.

PHILIP H. BILLS.
JOSEPH A. LOGAN.
THEODORE J. MESH.

No references cited.